Jan. 24, 1956     A. C. OTTO ET AL     2,731,850
CONTROL DEVICE FOR MOTOR VEHICLES
Filed May 22, 1951     2 Sheets-Sheet 1
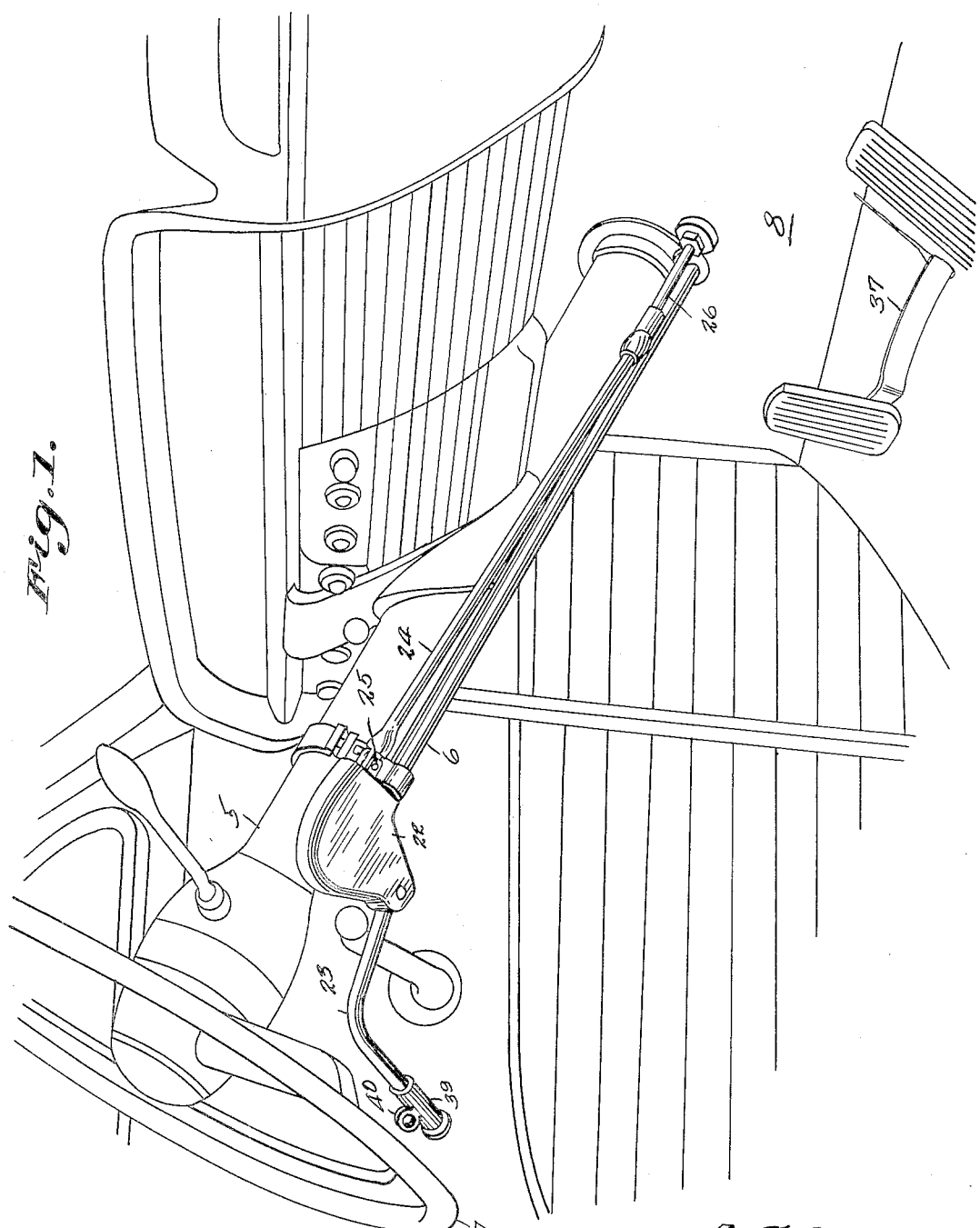
A.C.Otto
E.A.Otto
INVENTORS,
BY *C.A.Snow & Co.*
ATTORNEYS.

Jan. 24, 1956
A. C. OTTO ET AL
2,731,850
CONTROL DEVICE FOR MOTOR VEHICLES
Filed May 22, 1951
2 Sheets-Sheet 2
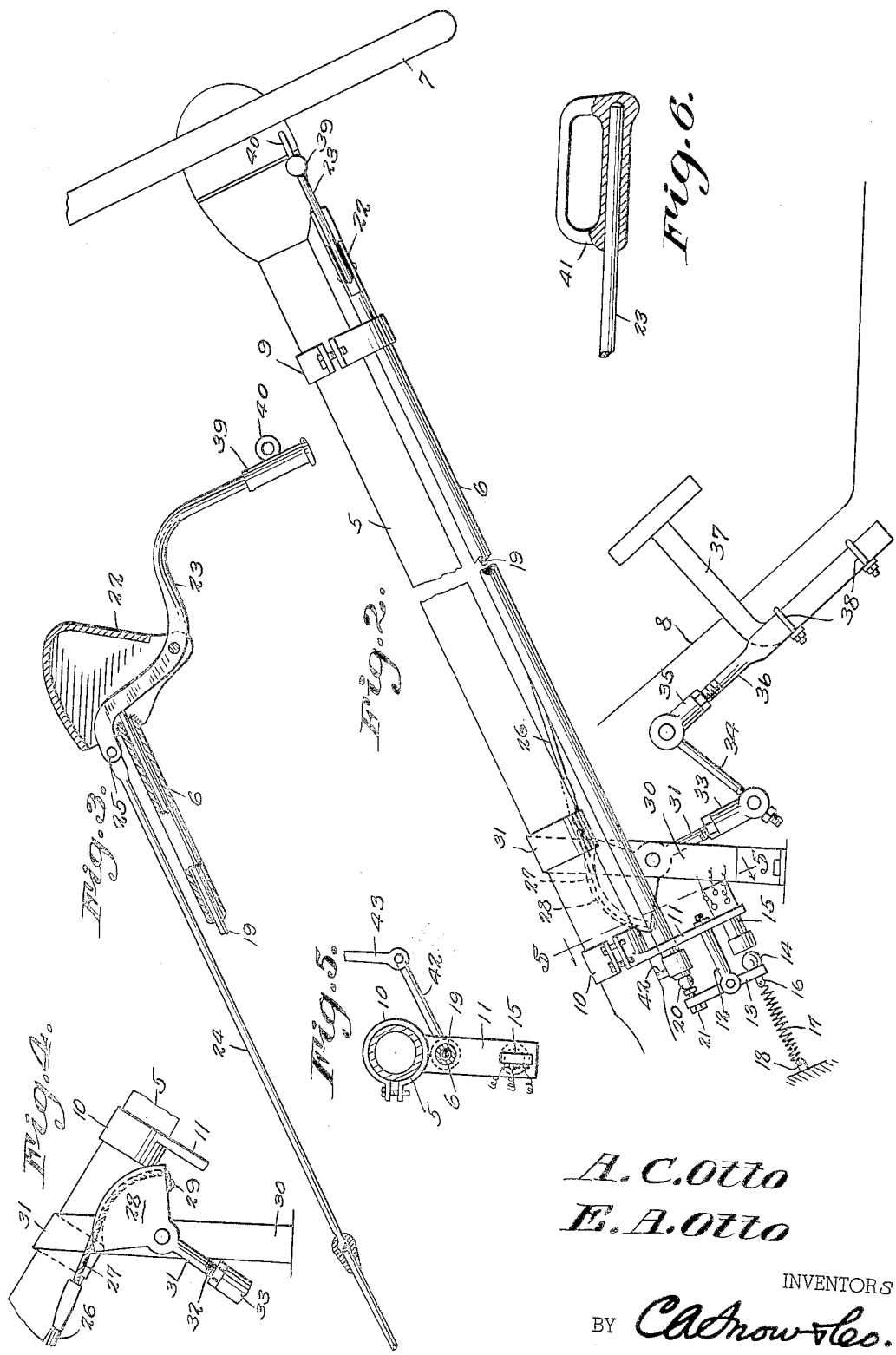
INVENTORS,
A. C. Otto
E. A. Otto
BY C. A. Snow & Co.
ATTORNEYS.

United States Patent Office 2,731,850
Patented Jan. 24, 1956

2,731,850
CONTROL DEVICE FOR MOTOR VEHICLES
Arthur C. Otto and Earl A. Otto, Chilton, Wis.

Application May 22, 1951, Serial No. 227,615

2 Claims. (Cl. 74—484)

This invention relates to a device designed for attachment to motor vehicles, the object of the invention being to provide a control means for controlling the accelerator, brake and headlight dimmer switch, by the operation of the arms, eliminating the usual foot control mechanisms commonly employed in operating and controlling motor vehicles.

An important object of the invention is to provide means for converting the operating mechanisms of motor vehicles for operation by physically handicapped persons, such as leg amputees, paraplegics or the like.

Still another object of the invention is to provide operating means embodying a plurality of operating rods and tubes, controlled by a manually operated lever common to all of the control rods or tube, forming a part of the operating means.

A still further object of the invention is to provide a control mechanism wherein the brake can be applied and released gradually and at the same time control the feeding of gasoline to the engine which is frequently necessary, particularly when the vehicle is moving up-grade.

With the foregoing and other objects in view which will appear as the description proceeds, the invention consists of certain novel details of construction and combinations of parts hereinafter more fully described and pointed out in the claims, it being understood that changes may be made in the construction and arrangement of parts without departing from the spirit of the invention as claimed.

Referring to the drawings:

Figure 1 is a perspective view of the interior of a motor vehicle equipped with the control device forming the subject matter of the present invention.

Fig. 2 is a side elevational view of the mechanism as mounted on the steering column of a motor vehicle.

Fig. 3 is a fragmental sectional view illustrating the support for the control lever and connection between the control lever and operating mechanism.

Fig. 4 is a fragmental elevational view illustrating the connection between the operating rod and brake pedal.

Fig. 5 is a sectional view taken on line 5—5 of Fig. 2.

Fig. 6 is a view illustrating a hand grip to be used by a person with a paralized hand.

Referring to the drawing in detail, the reference character 5 indicates the steering column of a motor vehicle, to which the attachment forming the subject matter of the present invention, is secured. The attachment comprises the tube 6 which extends from a point adjacent to the steering wheel 7 of the vehicle, the lower end of the tube terminating at a point below the floor board 8 of the vehicle, as clearly shown by Fig. 2 of the drawings. The tube 6 is mounted in bearings formed in the clamps 9 and 10, which are clamped around the steering column 5, the bearings of the clamps 9 and 10 being in alignment to receive the tube 6 which is pivotally mounted therein. The clamp 10 includes the plate 11 which extends a substantial distance beyond the steering column 5 where it provides a support for the bolt 12 to which the arm 13 is pivotally connected, the arm 13 having an opening in which the ball 14 is positioned, the ball being so disposed that it will contact the dimmer control switch 15 of the vehicle and this ball 14 is provided with an extension 16 to which the spring 17 is connected, the spring 17 having one of its ends anchored to the vehicle frame at 18, so that under normal conditions the ball 14 is held out of contact with the switch 15.

The reference character 19 indicates the dimmer light control rod that extends through the tube 6, the lower end of the rod 19 being provided with the ball 20 that rotates against the adjustable stop 21, secured to the lower end of the rod 19.

As clearly shown by Fig. 3 of the drawings, the upper end of the tube 6 extends into the lever housing 22 where it is welded to the lever housing to move therewith. The rod 19 is of a length to extend beyond the end of the tube 6, where it contacts with the lever 23 adjacent to the inner end thereof, the lever being of a length to extend to a point directly under the steering wheel 7 of the vehicle in spaced relation therewith.

The inner end of the lever 23 is pivotally connected with the shaft 24 of the brake control rod, at 25, the opposite end of the brake control rod 24 having universal connection with the brake rod section 26, to which one end of the cable 27 is connected, the cable moving in a groove formed in the segment 28, with its opposite end connected to the segment 28 at 29. This segment 28 is pivotally mounted on the supporting arm 30, which is secured to the vehicle frame with its upper end 31 bent around the steering column 5 to support and secure the upper end of the arm 30.

Extending from the segment 28 is the rod 31 which is threaded at 32 to receive the socket member 33 to which the rod 34 is connected, the rod 34 having pivotal connection with the member 35 which is threaded on one end of the rod 36, which in turn is secured to the brake pedal shank 37 by means of clips 38.

The lever 23 is provided with a member 39 at its free end, which is formed with the ring 40 through which a hook may be extended when the device is to be operated by a hook commonly used by hand amputees.

As shown by Fig. 6 of the drawings a special type of lever grip is indicated by the reference character 41, the grip being primarily designed for convenience in operation by a person with a paralized hand, the lever grip being so designed that the paralized hand may be fitted in the grip to connect the hand with the lever.

At the lower end of the tube 6, is secured the arm 42 which extends laterally therefrom, the arm 42 being connected by the link 43 to the carburetor control valve, not shown, to the end that by rotating the tube 6, the arm 42 and link 43 may be operated to control the feeding of gas to the carburetor, controlling the speed of the vehicle.

In the operation of the attachment, it will be seen that when it is desired to control the gas flow to the carburetor, the lever 23 is moved in the arc of a circle under the steering wheel 7, whereupon the arm 42 and link 43 are operated moving the carburetor valve as desired.

Should it be necessary to apply the brake, the lever 23 may be forced downwardly, whereupon the segment 28 will be rotated to cause the connecting means between the segment and brake pedal crank 37 to operate the brake applying the brake. It is obvious that when downward pressure on the lever 23 is relieved, the brake will assume its normal running position.

Should it be desired to control the dimmer lights, this can be done by a slight upward pull on the lever 23, which forces the dimmer light of the control rod downwardly, operating the dimmer light control switch.

With this attachment, it is possible to operate the lever 23 to gradually relieve the brake and at the same time increase the supply of gas to the carburetor, which is frequently necessary in starting a car on an up-grade.

Having thus described the invention, what is claimed is:

1. A hand-controlled mechanism for use in operating the carburetor valve control arm, pivoted brake rod of a brake actuating mechanism, and dimmer light switch of a motor vehicle, comprising a tube, means for rotatably securing the tube to the steering column of a motor vehicle in longitudinal spaced relation therewith, a lever housing rigidly secured to the upper end of said tube directly under the steering wheel of the vehicle, connecting means between the lower end of said tube and carburetor valve control arm, a dimmer light control rod extending through said tube, the upper end of said rod extending into said lever housing, the lower end of said rod extending beyond the lower end of said tube, a dimmer light control switch operating arm pivotally supported intermediate its ends at the lower end of said rod, the lower end of said rod normally resting against one end of said arm, the other end of said arm adapted to engage said dimmer light switch, operating said dimmer light switch upon downward movement of said rod, an operating lever pivotally connected with the housing extending into the housing adapted to rotate said housing and tube, operating said carburetor control valve, said lever resting against the upper end of said rod for moving said rod longitudinally of the tube in one direction operating said dimmer light, and a brake control rod pivotally connected with one end of said operating lever adapted to move said brake control rod vertically operating said brake actuating mechanism.

2. A hand-controlled mechanism for use in operating the carburetor valve control arm, brake actuating arm and dimmer light switch of a motor vehicle comprising a tube, means for rotatably securing the tube to the steering column of a motor vehicle in longitudinal spaced relation therewith, connecting means between one end of the tube and carburetor valve control arm, a lever housing secured to the upper end of the tube, a rod extending through the tube terminating within the lever housing, a pivoted lever secured within the housing for effecting rotation of said housing and tube, a pivoted dimmer light switch operating arm mounted at the lower end of said tube, said lever bearing against the upper end of said rod adapted to move said rod longitudinally of said tube effecting operation of said dimmer light switch by contact with said pivoted dimmer light switch operating arm, a second rod connected to said lever, and connecting means between said second rod and brake actuating arm whereby said brake actuating arm and brake are operated upon pivotal movement of said lever in one direction.

References Cited in the file of this patent

UNITED STATES PATENTS

| 1,020,889 | Daebler | Mar. 19, 1912 |
| 1,273,514 | McFarland | July 23, 1918 |
| 1,403,390 | Cameron | Jan. 10, 1922 |
| 1,551,696 | Reynolds | Sept. 1, 1925 |
| 2,177,459 | Price | Oct. 24, 1939 |
| 2,249,176 | Rubly | July 15, 1941 |
| 2,257,852 | Nicol | Oct. 7, 1941 |
| 2,269,970 | Bundy | Jan. 13, 1942 |
| 2,523,491 | Auten | Sept. 26, 1950 |
| 2,537,222 | Horne | Jan. 9, 1951 |
| 2,548,240 | Reeder | Apr. 10, 1951 |
| 2,602,348 | Wilson | July 8, 1952 |

OTHER REFERENCES

Autocar Magazine, January 31, 1947, pp. 96–97.